United States Patent
Regni et al.

(10) Patent No.: US 12,141,447 B2
(45) Date of Patent: Nov. 12, 2024

(54) ERASURE CODING IMPLEMENTATION WITH REDUCED PARITY CALCULATION OVERHEAD

(71) Applicant: SCALITY, S.A., Paris (FR)

(72) Inventors: Giorgio Regni, Albany, CA (US); Lam Pham Sy, Issy-les-Moulineaux (FR); Benoit Artuso, Hadol (FR); Frederic Ferrandis, Saint Leu la Foret (FR); Vianney Rancurel, Sausalito, CA (US)

(73) Assignee: Scality, S.A., Paris (FR)

( * ) Notice: Subject to any disclaimer, the term of this patent is extended or adjusted under 35 U.S.C. 154(b) by 100 days.

(21) Appl. No.: 17/960,124

(22) Filed: Oct. 4, 2022

(65) Prior Publication Data

US 2024/0111432 A1  Apr. 4, 2024

(51) Int. Cl.
*G06F 12/00* (2006.01)
*G06F 3/06* (2006.01)
*G06F 11/10* (2006.01)

(52) U.S. Cl.
CPC ............ *G06F 3/0619* (2013.01); *G06F 3/065* (2013.01); *G06F 3/0683* (2013.01); *G06F 11/1004* (2013.01)

(58) Field of Classification Search
None
See application file for complete search history.

(56) References Cited

U.S. PATENT DOCUMENTS

| 2017/0308437 A1 | 10/2017 | Usvyatsky et al. |
| 2017/0351575 A1 | 12/2017 | Baker et al. |
| 2018/0210668 A1 | 7/2018 | Hassner et al. |
| 2019/0042365 A1* | 2/2019 | Malone ............... H03M 13/154 |

FOREIGN PATENT DOCUMENTS

KR    1020210137921 A    11/2021

OTHER PUBLICATIONS

International Search Report and Written Opinion for PCT Patent Application No. PCT/US23/34453, Mailed Jan. 30, 2024, 9 pages.

* cited by examiner

*Primary Examiner* — Daniel D Tsui
(74) *Attorney, Agent, or Firm* — Compass IP Law PC

(57) ABSTRACT

A method is described. The method includes storing data extent replicas for each of a plurality of data extents, wherein, data extent replicas for a same one of the data extents are stored in different physical storage devices, and wherein, a same physical storage device is permitted to store respective data extent replicas of different ones of the data extents. The method includes writing the respective data extent replicas for at least one of the data extents multiple times without calculating one or more parity extents for the plurality of data extents. The method includes upon a writing activity criteria having been met, calculating one or more parity extents for the data extents and storing the parity extents, and, preserving at least one of the data extent replicas for each of the plurality of data extents.

17 Claims, 8 Drawing Sheets

ERASURE CODING IMPLEMENTATION WITH REDUCED PARITY CALCULATION OVERHEAD

FIELD OF INVENTION

The field of invention pertains generally to the computing sciences, and, more specifically, to an erasure coding implementation with reduced parity calculation overhead.

BACKGROUND

With the emergence of "big data" computing, more and more applications are seeking faster access to mass storage, while, at the same time, preserving data integrity.

FIGURES

FIGS. 2a, 2b, 2c, 2d, 2e and 2f depict an improved erasure coding implementation;

DETAILED DESCRIPTION

Figure 1:
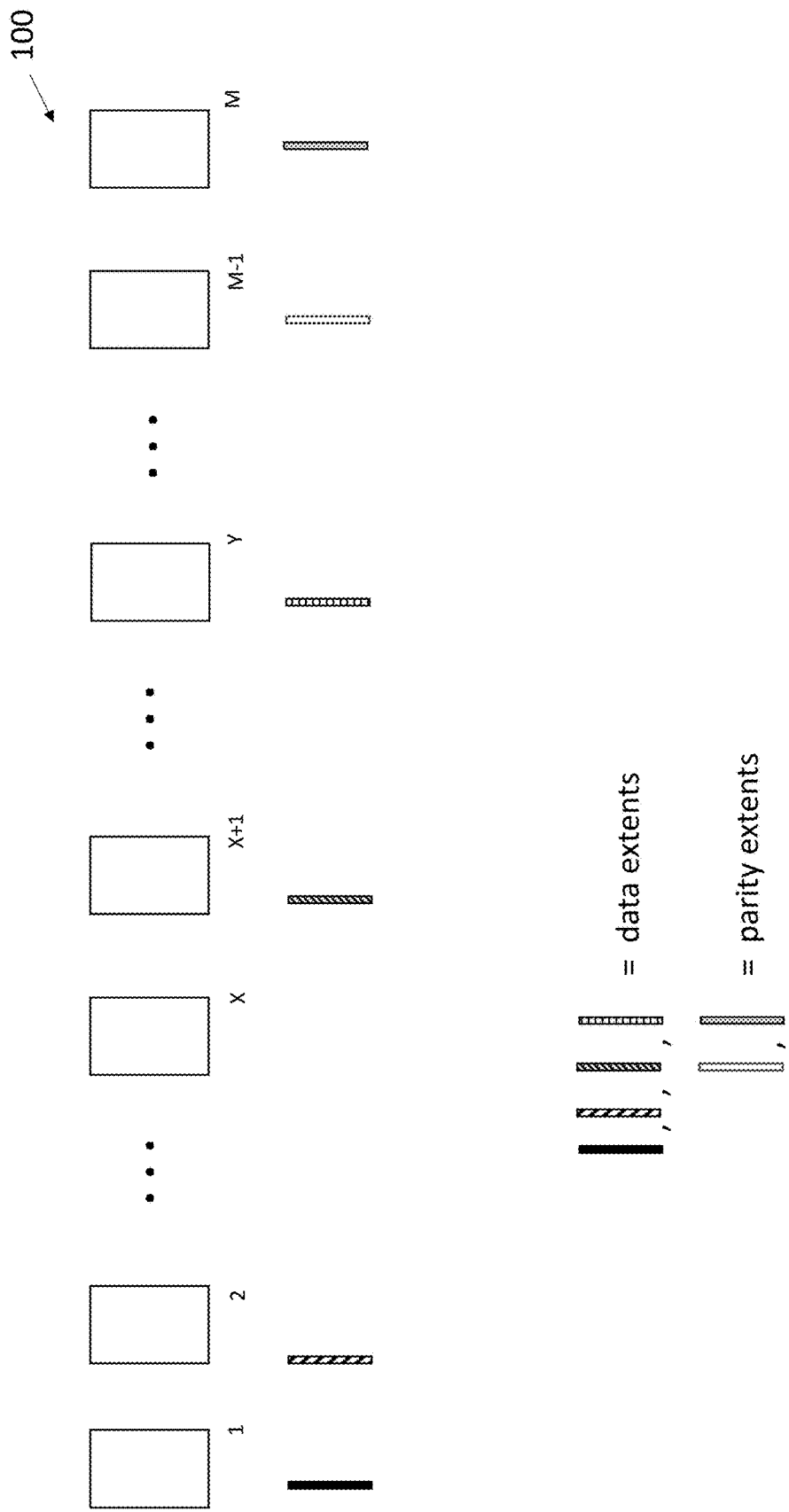
FIG. 1 depicts an erasure coding implementation (prior art)

FIG. 1 depicts a high level view of a non-volatile, mass storage system 100. As observed in FIG. 1, the storage system 100 is composed of M non-volatile, mass storage ("physical") storage devices (1 through M). Each of the physical storage devices are units of storage each capable of storing multiple units of information, referred to as "extents". Additionally, each of the physical storage devices are capable of failing resulting in a loss of all extents stored by the device. For example, each of the physical storage devices 1 through M can be a disk drive or solid state drive (SSD). Each disk drive or SSD can store, e.g., millions or billions of extents, and, failure of a disk drive or SSD risks loss of all the drive's/SSD's extents.

When a customer writes data into the storage system 100, the data is written into a specific extent in the physical storage devices. For example, in the case of an object storage system 100, when a customer writes an object into the system, the object is written into one of the extents of one of the storage devices. If the size of an object is smaller than the size of an extent, additional object(s) can be stored into the same extent (by contrast, if the size of the object is larger than the size of an extent, the object can be broken into pieces and stored into multiple extents).

Extents that hold customer/user data are referred to as data extents. Thus, at any moment in time, the storage system 100 can contain many units of customer data that have been written into many data extents of the storage system 100.

Erasure encoding is a technique in which the data extents are protected with other extents containing parity information ("parity extents"). Here, for example, the data content of a group of k data extents stored in different ones of the physical storage devices are processed by a mathematical algorithm which provides n parity extents. The n parity extents are then stored in additional different physical storage devices such that each of the k+n extents are stored in a different physical storage device. That is, k+n different storage devices are used to store the k data extents and the n parity extents.

If up to n of any of the k+n storage devices fail, the original k data extents can be recovered by processing the remaining extents with a corresponding mathematical algorithm. FIG. 1 depicts a basic example in which there are four data extents (k=4) and two parity extents (n=2) which form a (4,2) extent group (the two parity extents have been calculated from the four data extents). As observed in FIG. 1, the four data extents are stored in physical storage devices 1, 2, X-1 and Y whereas the two parity extents have been stored in physical storage devices M-1 and M.

Here, if up to two of any of the six physical storage devices (1, 2, X-1, Y, M-1 and M) suffer a failure, the content of the k data extents can be completely recovered by processing the remaining four or five extents (regardless of their data or parity status) with a corresponding mathematical algorithm.

A problem, however, exists when certain data extents are frequently written to. Here, each time a data extent is updated with new information, the content of the parity extents for the data extent's extent group must be recalculated and stored back into the storage system. This creates a large computational overhead for storage systems whose data extents are frequently changing.

FIGS. 2a through 2f depict an improved storage process that reduces the processing overhead (parity need not be recalculated with each write to a data extent in an extent group), while, at the same, data extents are protected against physical storage device failure.

Here, as will be made more clear in the following example, data extents are protected by way of replication in the storage system for, e.g., an extended period of time. At an appropriate time (e.g., after some amount of writing activity has been directed to the data extents), a representative one from each of the k replicated data extents are selected and processed according to an erasure coding algorithm to generate n parity extents for the k selected data extents thereby forming an extent group. The extent group composed of the k selected data extents and n parity extents are then stored in the storage system. The un-selected copies (replications) of the data extents are then free to be written over (because the data extents are now protected by the parity extents rather than through replication).

Figure 2A:
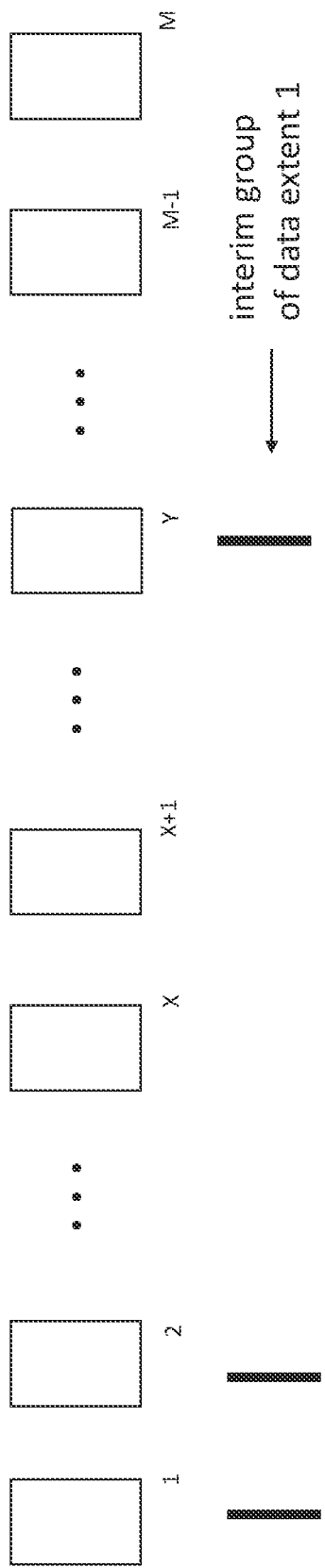

FIG. 2a shows an initial state in which a first data extent (data extent 1) is replicated across three physical storage devices 1, 2 and Y. The concurrent storage of the three replications of data extent 1 is referred to as an interim group for data extent 1. As will be described in more detail below, a (4,2) erasure coding scheme will ultimately be utilized in which four data extents are protected by two parity extents. That is, k=4 and n=2. Notably, in FIG. 2a, there are n+1 (i.e., three) replications in the interim group of data extent 1.

Here, whether protection is provided through replication or parity extents, n defines how many physical storage devices can fail without loss of any data extents. With the interim group for data extent 1 storing replications of data extent 1 into three storage devices 1, 2 and Y, under a worst case scenario, any n=2 of storage devices 1, 2 and Y can fail and data extent 1 will not be lost. As such, an interim group can remain in the storage system for an extended period of time without risk of loss of data for up to n=2 failures of the interim group's storage devices.

For the sake of example it is assumed that multiple data objects (e.g., data objects A, B and C) can be stored in a single data extent (if objects are larger than a data extent, a first portion of an object can be stored in a first data extent, a second portion of the object can be stored in a second data extent, etc.). As such, at any moment of time, there is a copy of object A, object B and object C in data extent 1 in each of storage devices 1, 2 and Y. With data extent 1 being protected by the replication of its interim group, each of data objects A, B and C can be continually written to with new data over extended periods of time (updates made to any of objects A, B and C are made in each of storage devices 1, 2 and Y to effect the requisite replication). In this way, the problem of having to calculate new parity extents with each new write/update is avoided.

Figure 2B:
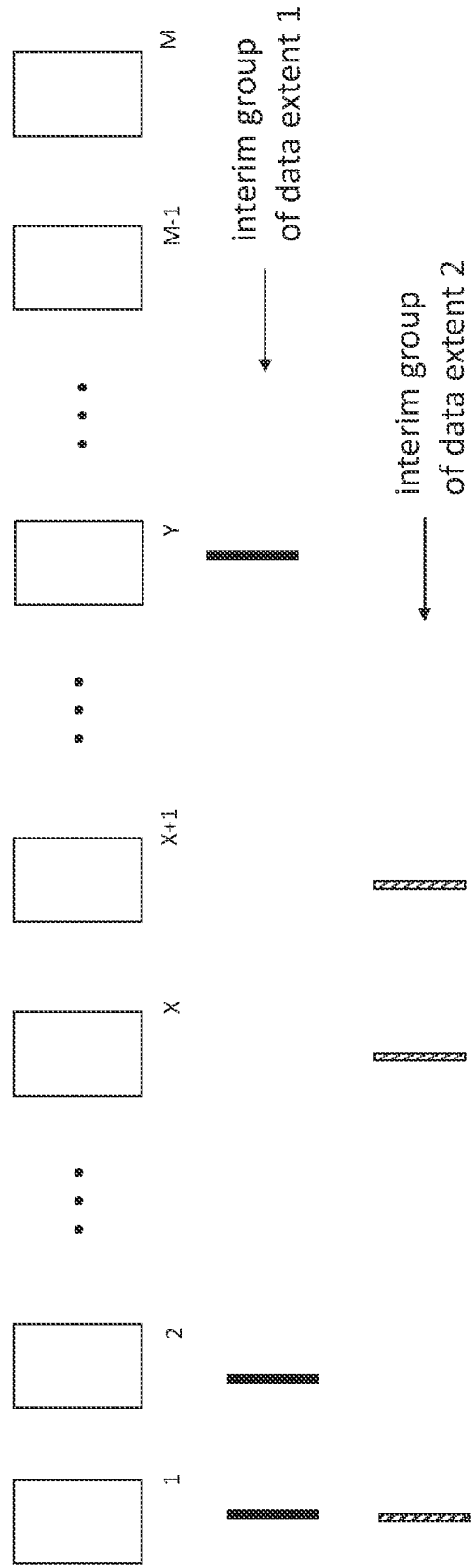

FIG. 2b shows a later moment in time in which a second interim group for a second data extent (data extent 2) is stored in storage devices 1, X and X+1. Here, again, it is assumed that multiple data objects (e.g., data objects D, E and F) can be stored in data extent 2. As such, at any moment of time, there is a copy of object D, object E and object F in data extent 2 in each of storage devices 1, X and X+1. With data extent 2 being protected by the replication of its interim group, each of data objects D, E and F can be continually written to with new data over extended periods of time (updates made to any of objects D, E and F are made in each of storage devices 1, X and X+1 to effect the requisite replication).

Figure 2C:
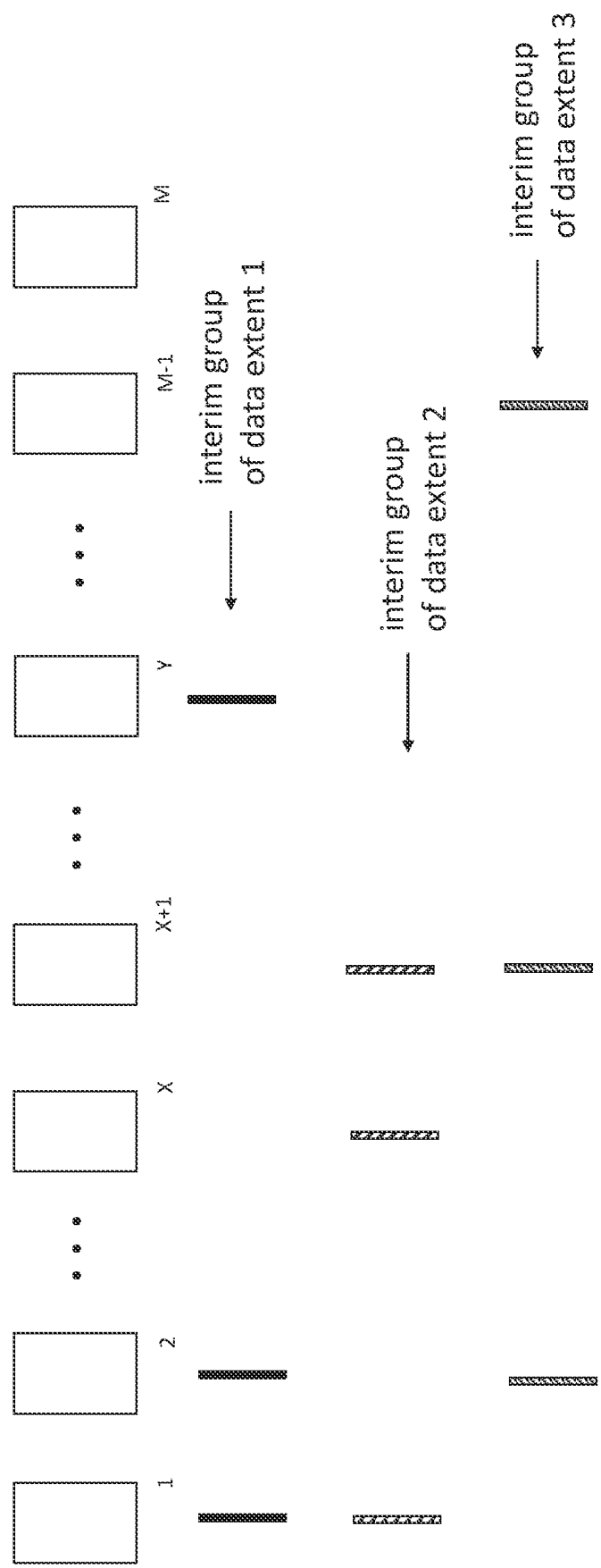

FIG. 2c shows another later moment in time in which a third interim group for a third data extent (data extent 3) is stored in storage devices 2, X+1 and M−1. Here, again, it is assumed that multiple data objects (e.g., data objects G, H and I) can be stored in data extent 3. As such, at any moment of time, there is a copy of object G, object H and object I in data extent 3 in each of storage devices 2, X+1 and M−1. With data extent 3 being protected by the replication of its interim group, each of data objects G, H and I can be continually written to with new data over extended periods of time (updates made to any of objects G, H and I are made in each of storage devices 2, X+1 and M−1 to effect the requisite replication).

Figure 2D:
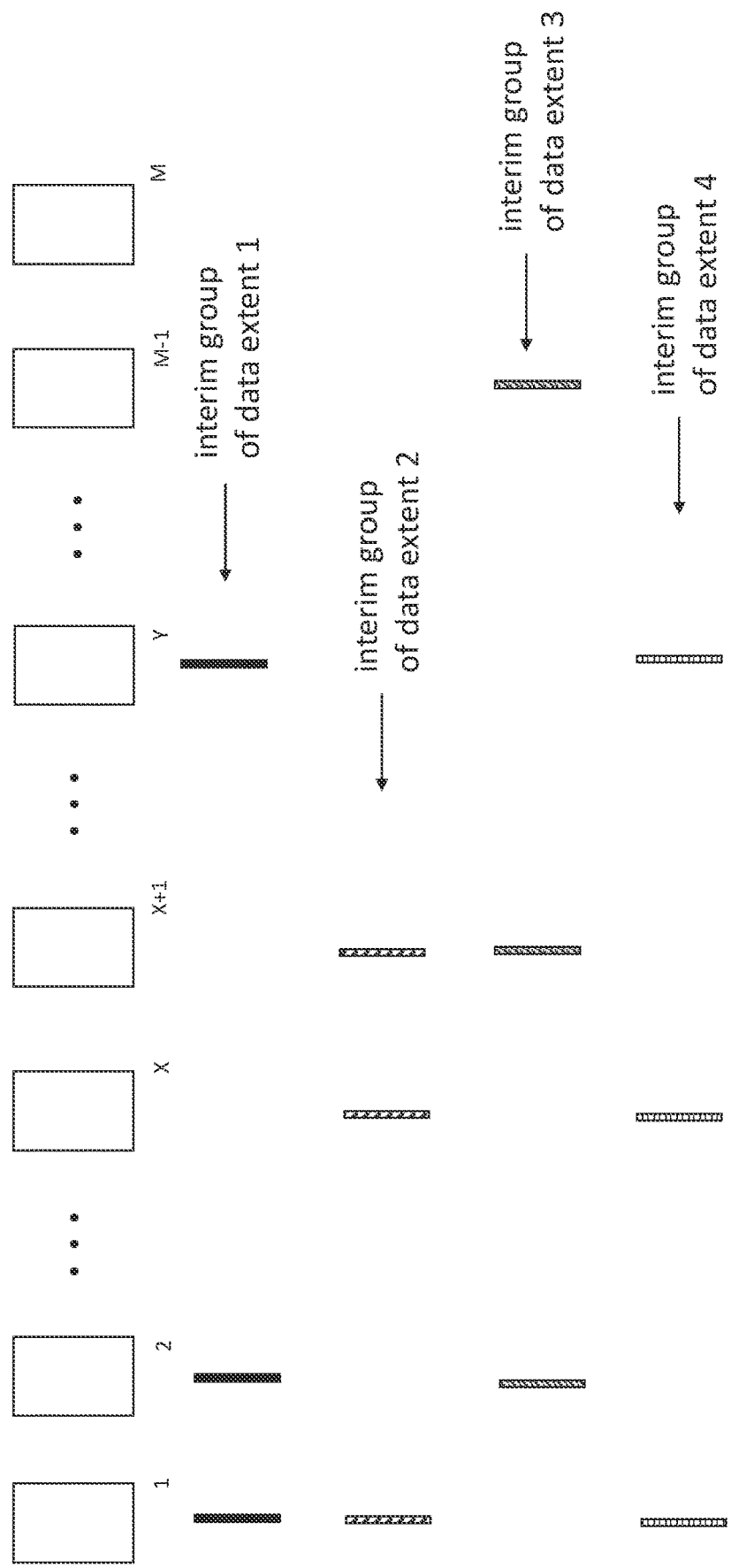

FIG. 2d shows another later moment in time in which a fourth interim group for a fourth data extent (data extent 4) is stored in storage devices 1, X and Y. Here, again, it is assumed that multiple data objects (e.g., data objects R, S and T) can be stored in data extent 4. As such, at any moment of time, there is a copy of object R, object S and object T in data extent 4 in each of storage devices 1, X and Y. With data extent 4 being protected by the replication of its interim group, each of data objects R, S and T can be continually written to with new data over extended periods of time (updates made to any of objects R, S and T are made in each of storage devices 2, X+1 and M−1 to effect the requisite replication).

As of the state of FIG. 2d, there are four respective interim groups for four different data extents. As such, referring to FIG. 2e, one representative data extent is chosen from each of the four interim groups where none of the chosen data extents are stored in a same storage device. Here, as observed in FIG. 2e, each of the selected data extents are chosen from a different storage device: 1) the selection for data extent 1 is chosen from storage device 1; 2) the selection for data extent 2 is chosen from storage device X; 3) the selection for data extent 3 is chosen from storage device X+1; and, 4) the selection for data extent 4 is chosen from storage device Y.

Figure 2E:
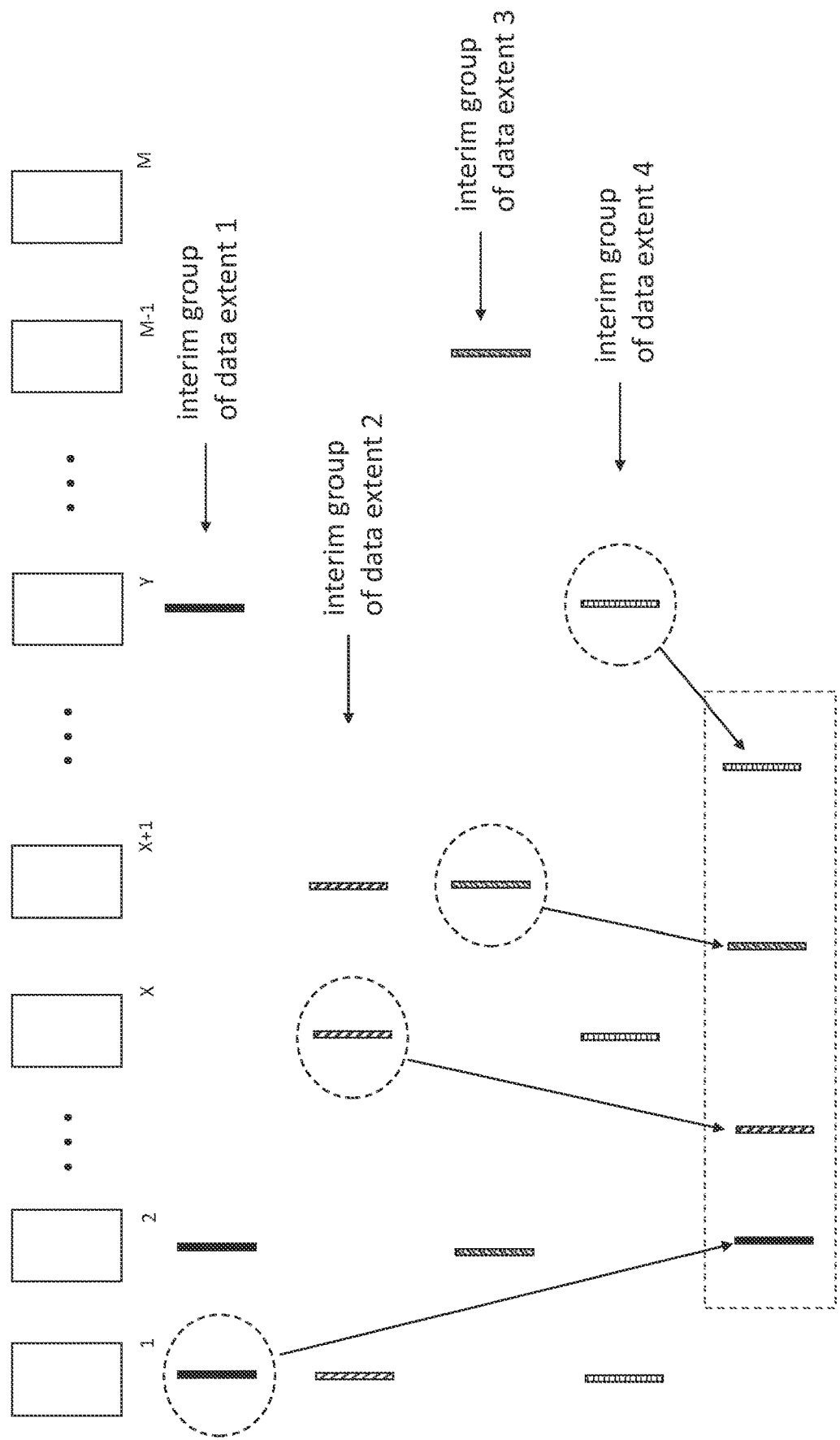
Figure 24:
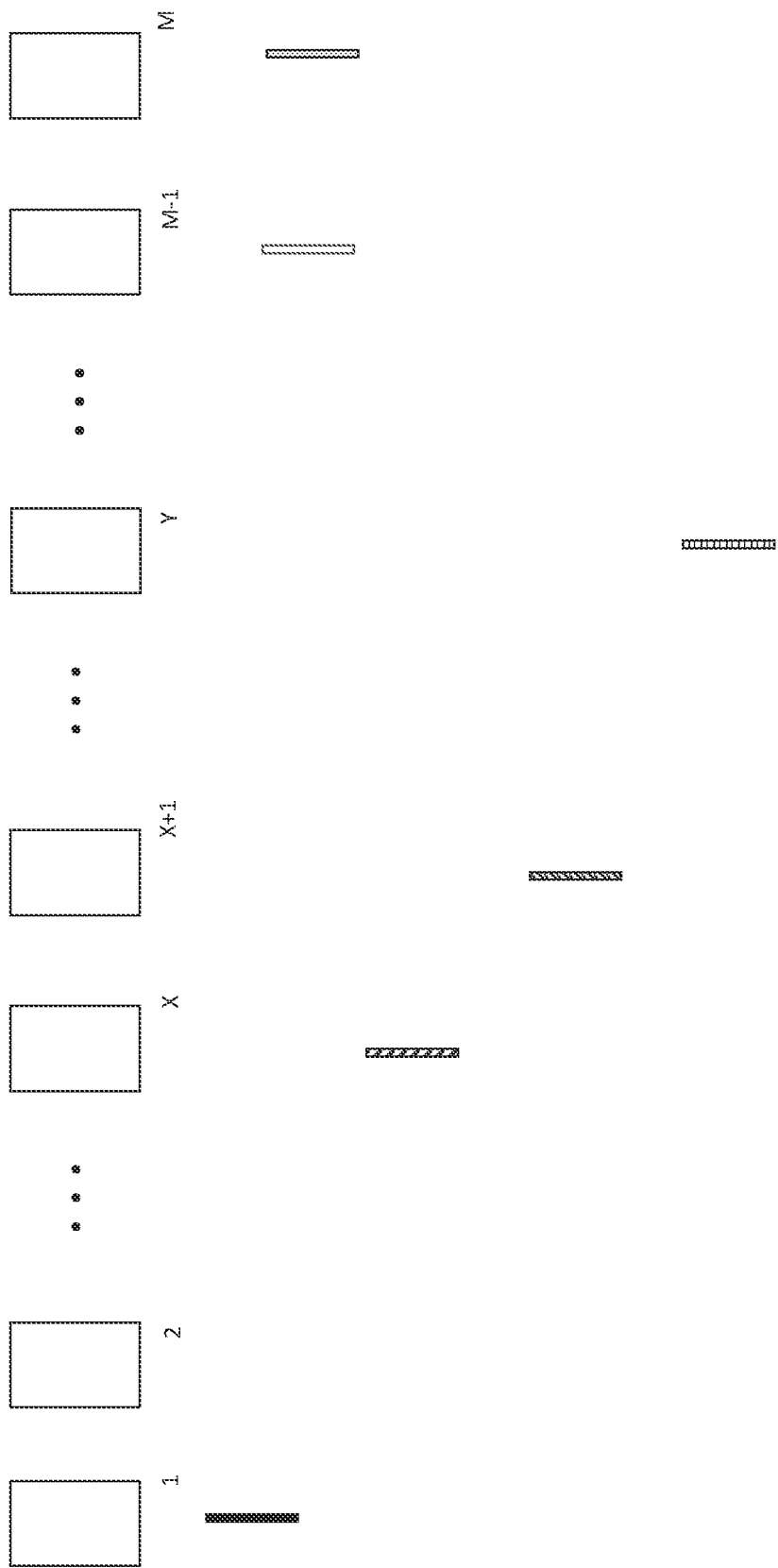

The set of selected data extents therefore mimics a nominal set of data extents for an extent group protected by an erasure coding scheme where k=4. Said another way, the selected data extents of FIG. 2e is similar to the data extents observed in FIG. 1. With k=4 data extents having been selected from k=4 different storage devices, the k data extents are then processed by a (4,2) erasure coding algorithm which generates n=2 parity segments.

Referring to FIG. 2e, the n=2 parity segments are then stored in two additional different storage devices M−1, M where none of the k selected data extents are stored which, in turn, corresponds to a fully formed (4,2) extent group being stored in the storage system. With protection now being provided through the existence of the parity extents, replication is no longer needed. As such, the un-selected data extents of FIG. 2d can be freed. That is, the un-selected data extents of FIG. 2d can be written over, e.g., with objects other than the specific objects they were storing during the existence of their respective interim groups.

Once protection is established with parity, the process of FIGS. 2a through 2f, can restart again with subsequent writes to the objects being protected through interim group replication until the next time when parity extents are calculated. Note that, in the example above, the restart of the process only needs to identify n=2 new storage devices per interim group to store the replications of any data extent because the data extent that was selected and preserved in the process of FIGS. 2a through 2f can be used as one of the data extents in the interim group for the next sequence of replication protection.

Thus, in this manner, protection is provided for multiple data extents, potentially over extended run lengths of time, through replication with the overhead processing associated with parity extent calculation being performed less frequently than after every write to a data extent. As such, the parity processing overhead associated with erasure coding is greatly reduced as compared to traditional approaches where each new write to a data extent causes re-execution of the encoding algorithm.

Said another way, more generally, the process of FIGS. 2a through 2e is designed to disperse parity calculations in between extended episodes in which the data extents of an extent group are potentially written to many times. Notably, this approach can be used to support a "snapshot" function in which the state of the extent groups data content is preserved with parity protection. Here, each time parity protection is executed and stored it is preserved and associated with a timestamp. By fetching the stored extent group based on the timestamp, the state of the data extents as of the timestamp can be retrieved at any subsequent time.

There are various ways to determine whether, in order to trigger a next parity extent calculation, sufficient time has elapsed and/or sufficient write activity has been applied to the data extents in the interim groups. According to various embodiments, time and/or write activity is monitored for each interim group. As each interim group surpasses a threshold for whatever time and/or write activity criteria is established, the interim group is "closed".

In an embodiment, when an interim group is closed, writes can no longer be made to the extents in the interim group. When all interim groups for a same extent group are closed, parity extents are calculated for the data extents and the extent group is stored as per the techniques described above with respect to FIGS. 2e and 2f. Here, any writes directed to a closed interim group are enqueued by the system (not executed) until after the parity extents have been calculated for the extent group and the extent group has been stored. In alternative embodiments, closure of an interim group means a sufficient amount of write activity has been directed to the interim group to allow the interim group's extent(s) to be processed for calculation of the extent group's parity extents (the closed interim group can still be written to after it is closed).

According to one embodiment, with each data extent corresponding to an amount of storage space, an interim group is deemed closed when a threshold percentage of the storage space of the data extents in an interim group have been consumed. For example, in a simplistic case where objects are all of a same size and the data extents of an interim group can store up to a maximum of four objects, a threshold setting of 75% will be met when the data extents in an interim group store three objects. In this case, an interim group is deemed closed when the data extents in an extent group store three objects (which is consistent with the example described just above with respect to FIGS. 2a through 2f).

According to another embodiment, an interim group is deemed closed after some threshold number of writes have been applied to the interim group.

According to another embodiment, an interim group is deemed closed after a pre-determined amount of time has elapsed.

According to other embodiments a number of criteria must be met (such as two or more of the criteria described just above) before an interim group is deemed closed.

In still yet other embodiments, criteria is established for all the interim groups of a same extent group rather than the interim groups individually. Here, for example, any of the criteria described just above can be applied but where the set of interim groups are taken as a collective whole. For example, if the number of total writes applied to the set of interim groups crosses some threshold, the set of interim groups is deemed closed and parity calculation can commence. According to this approach, parity calculation can be triggered, e.g., if only one interim group is being excessively written to while the others are not.

In still other embodiments, some combination of per interim group criteria and collective whole criteria is established in order to trigger parity calculation.

In various embodiments, as alluded to above, the storage system described above is an object storage system. As is known in the art, in the case of object storage systems, units of stored information ("objects") are identified with unique identifiers ("object IDs"). Thus, whereas a traditional file system identifies a targeted stored item with a path that flows through a directory hierarchy ("filepath") to the item, by contrast, in the case of object storage systems, targeted stored items are identified with a unique ID for the object.

In various other embodiments the storage system described above is a file storage system.

The storage system described above can be implemented at various capacity scales including a cloud service or large scale (e.g., large corporation's) proprietary storage system, a storage area network (e.g., composed of a plurality of storage servers interconnected by a network), the storage system of a computer, etc.

Figure 3:
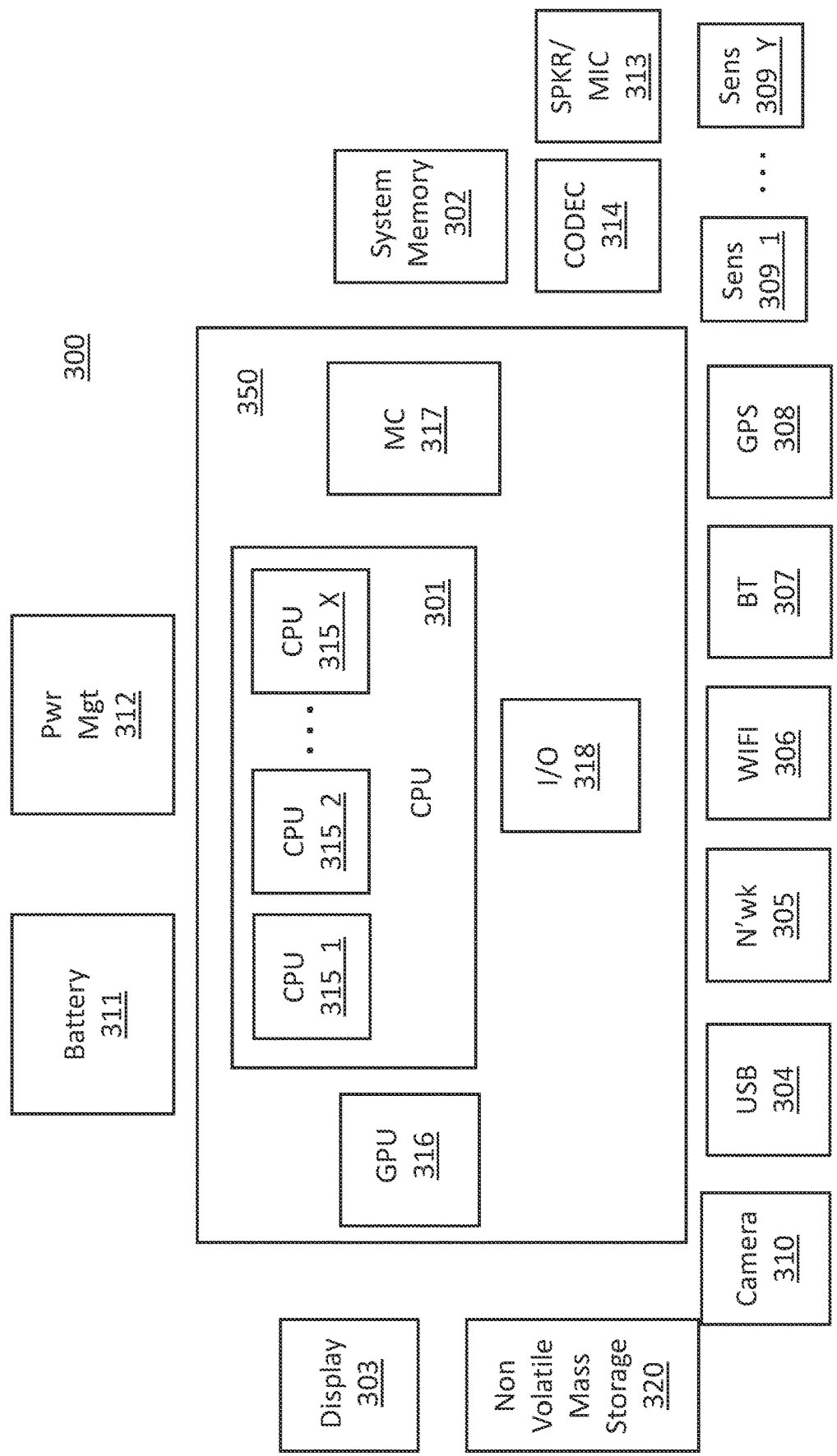
FIG. 3 depicts a computing system.

FIG. 3 provides an exemplary depiction of a computing system 300. Any of the aforementioned storage systems can be constructed, e.g., from one or more computers having components of the computing system 300 of FIG. 3 including one or more non volatile mass storage devices 320 that correspond to the physical storage devices described above.

As observed in FIG. 3, the basic computing system 300 may include a central processing unit (CPU) 301 (which may include, e.g., a plurality of general purpose processing cores 315_1 through 315_X) and a main memory controller 317 disposed on a multi-core processor or applications processor, main memory 302 (also referred to as "system memory"), a display 303 (e.g., touchscreen, flat-panel), a local wired point-to-point link (e.g., universal serial bus (USB)) interface 304, a peripheral control hub (PCH) 318; various network I/O functions 305 (such as an Ethernet interface and/or cellular modem subsystem), a wireless local area network (e.g., WiFi) interface 306, a wireless point-to-point link (e.g., Bluetooth) interface 307 and a Global Positioning System interface 308, various sensors 309_1 through 309_Y, one or more cameras 310, a battery 311, a power management control unit 312, a speaker and microphone 313 and an audio coder/decoder 314.

An applications processor or multi-core processor 350 may include one or more general purpose processing cores 315 within its CPU 301, one or more graphical processing units 316, a main memory controller 317 and a peripheral control hub (PCH) 318 (also referred to as I/O controller and the like). The general purpose processing cores 315 typically execute the operating system and application software of the computing system. The graphics processing unit 316 typically executes graphics intensive functions to, e.g., generate graphics information that is presented on the display 303. The main memory controller 317 interfaces with the main memory 302 to write/read data to/from main memory 302. The power management control unit 312 generally controls the power consumption of the system 300. The peripheral control hub 318 manages communications between the computer's processors and memory and the I/O (peripheral) devices.

Each of the touchscreen display 303, the communication interfaces 304-307, the GPS interface 308, the sensors 309, the camera(s) 310, and the speaker/microphone codec 313, 314 all can be viewed as various forms of I/O (input and/or output) relative to the overall computing system including, where appropriate, an integrated peripheral device as well (e.g., the one or more cameras 310). Depending on implementation, various ones of these I/O components may be integrated on the applications processor/multi-core processor 350 or may be located off the die or outside the package of the applications processor/multi-core processor 350. The computing system also includes non-volatile mass storage 320 which may be the mass storage component of the system which may be composed of one or more non-volatile mass storage devices (e.g., hard disk drive, solid state drive, etc.). The non-volatile mass storage 320 may be implemented with any of solid state drives (SSDs), hard disk drive (HDDs), etc.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard interconnected logic circuitry (e.g., application specific integrated circuit (ASIC) logic circuitry) or programmable logic circuitry (e.g., field programmable gate array (FPGA) logic circuitry, programmable logic device (PLD) logic circuitry) for performing the processes, or by any combination of program code and logic circuitry.

Elements of the present invention may also be provided as a machine-readable storage medium for storing the program code. The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions. The program code is to be executed by one or more computers.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
    storing data extent replicas for each of a plurality of data extents, wherein, data extent replicas for a same one of the data extents are stored in different physical storage devices, and wherein, a same physical storage device is permitted to store respective data extent replicas of different ones of the data extents;
    writing to the respective data extent replicas for at least one of the data extents multiple times without calculating one or more parity extents for the plurality of data extents; and,
    upon a writing activity criteria having been met, calculating one or more parity extents for the data extents and storing the parity extents, and, preserving at least one of the data extent replicas for each of the plurality of data extents;
    wherein the writing activity criteria having been met comprises meeting separate write activity criteria for the separate data extents as a condition for triggering the calculating of the parity extents.

2. The method of claim 1 wherein one data extent replica for each of the plurality of data extents is preserved.

3. The method of claim 2 wherein non-preserved ones of the data extent replicas are allowed to be written over after the parity extents have been stored.

4. The method of claim 1 wherein non-preserved ones of the data extent replicas are allowed to be written over after the parity extents have been stored.

5. The method of claim 1 wherein the parity extents are calculated with a (k,n) erasure coding algorithm and there are at least n+1 data extent replicas for each one of the data extents.

6. The method of claim 1 wherein the writing activity includes at least one:
    a period of time in which the data extent replicas are allowed to be written to;
    a number of writes being made to the data extent replicas of at least one of the data extents; and,
    a percentage of data extent replica capacity being written to.

7. One or more computers comprising program code stored on machine readable storage media that when processed by the one or more computers causes the one or more computers to perform a method, comprising:
    storing data extent replicas for each of a plurality of data extents, wherein, data extent replicas for a same one of the data extents are stored in different physical storage devices, and wherein, a same physical storage device is permitted to store respective data extent replicas of different ones of the data extents;
    writing to the respective data extent replicas for at least one of the data extents multiple times without calculating one or more parity extents for the plurality of data extents; and,
    upon a writing activity criteria having been met, calculating one or more parity extents for the data extents and storing the parity extents, and, preserving at least one of the data extent replicas for each of the plurality of data extents;
    wherein the writing activity criteria having been met comprises meeting separate write activity criteria for the separate data extents as a condition for triggering the calculating of the parity extents.

8. The one or more computers of claim 7 wherein one data extent replica for each of the plurality of data extents is preserved.

9. The one or more computers of claim 8 wherein non-preserved ones of the data extent replicas are allowed to be written over after the parity extents have been stored.

10. The one or more computers of claim 7 wherein non-preserved ones of the data extent replicas are allowed to be written over after the parity extents have been stored.

11. The one or more computers of claim 7 wherein the parity extents are calculated with a (k,n) erasure coding algorithm and there are at least n+1 data extent replicas for each one of the data extents.

12. The one or more computers of claim 7 wherein the writing activity includes at least one:
    a period of time in which the data extent replicas are allowed to be written to;
    a number of writes being made to the data extent replicas of at least one of the data extents; and,
    a percentage of data extent replica capacity being written to.

13. One or more computer readable storage media having program code stored thereon that when processed by one or more computers causes the one or more computers to perform a method, comprising:
    storing data extent replicas for each of a plurality of data extents, wherein, data extent replicas for a same one of the data extents are stored in different physical storage devices, and wherein, a same physical storage device is permitted to store respective data extent replicas of different ones of the data extents;
    writing to the respective data extent replicas for at least one of the data extents multiple times without calculating one or more parity extents for the plurality of data extents; and,
    upon a writing activity criteria having been met, calculating one or more parity extents for the data extents and storing the parity extents, and, preserving at least one of the data extent replicas for each of the plurality of data extents;
    wherein the writing activity criteria having been met comprises meeting separate write activity criteria for the separate data extents as a condition for triggering the calculating of the parity extents.

14. The one or more machine readable media of claim 13 wherein one data extent replica for each of the plurality of data extents is preserved.

15. The one or more machine readable media of claim 14 wherein non-preserved ones of the data extent replicas are allowed to be written over after the parity extents have been stored.

16. The one or more machine readable media of claim 13 wherein non-preserved ones of the data extent replicas are allowed to be written over after the parity extents have been stored.

17. The one or more machine readable media of claim 13 wherein the parity extents are calculated with a (k,n) erasure coding algorithm and there are at least n+1 data extent replicas for each one of the data extents.

* * * * *